(12) United States Patent
Foo

(10) Patent No.: US 6,662,256 B1
(45) Date of Patent: Dec. 9, 2003

(54) SEQUENTIAL BUS ARCHITECTURE

(75) Inventor: Yoong-Chert Foo, Sydney (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/553,856

(22) Filed: Apr. 21, 2000

(30) Foreign Application Priority Data

Apr. 29, 1999 (AU) .............................................. PQ0050

(51) Int. Cl.⁷ ............................................. G06F 13/14
(52) U.S. Cl. ..................... 710/305; 710/20; 710/36; 710/38; 710/316
(58) Field of Search ................................ 710/305, 306, 710/316, 317, 36, 38, 20, 15, 7–9

(56) References Cited

U.S. PATENT DOCUMENTS

| | | | | |
|---|---|---|---|---|
| 4,263,736 A | * | 4/1981 | Beierwaltes et al. | 40/452 |
| 4,356,404 A | * | 10/1982 | Comfort et al. | 307/115 |
| 4,378,589 A | * | 3/1983 | Finnegan et al. | 712/2 |
| 4,816,993 A | * | 3/1989 | Takahashi et al. | 712/28 |
| 4,922,409 A | * | 5/1990 | Schoellkopf et al. | 710/316 |
| 5,347,515 A | * | 9/1994 | Marino | 370/447 |
| 5,375,097 A | * | 12/1994 | Reddy et al. | 365/230.06 |

FOREIGN PATENT DOCUMENTS

| | | | | |
|---|---|---|---|---|
| EP | 0 186 150 | * | 7/1986 | G06F/15/16 |
| WO | WO9637984 | * | 11/1996 | H04L/12/40 |

* cited by examiner

Primary Examiner—Frantz B Jean
(74) Attorney, Agent, or Firm—Fitzpatrick, Cella, Harper & Scinto

(57) ABSTRACT

A bus architecture system is disclosed. The bus architecture system is formed within an integrated circuit device 30 having a communications port 34 configured to permit interface with electronics systems not illustrated. The port 34 connects to a communications module 32 forming part of a sequential bus arrangement incorporating a number of modules 36A–36E of the device 30 and a number of uni-directional interconnections 38A–38F arranged between sequential ones of those modules 36A–36E. The bus architecture system provides for the configuration of an ASIC prior to actual operation of the ASIC, and also for examination of the operation of the ASIC for debugging purposes.

20 Claims, 6 Drawing Sheets

SEQUENTIAL BUS ARCHITECTURE

FIELD OF THE INVENTION

The present invention relates to bus architectures and, in particular, to a sequential arrangement which consumes minimal space when implemented in hardware, particularly in integrated applications.

BACKGROUND

Various bus architectures have been developed over the years to handle a variety of situations which require the communication of information between individual devices and/or modules in electronic systems. The extent of which certain bus architectures are utilized depends upon a number of factors included the rate of data transfer required to be implemented by the bus, the particular environment in which data transfer is being conducted, and the distance over which data must be transferred.

In computing systems such as personal computers and the like, buses are formed typically by parallel bi-directional arrangements controlled by a microprocessor type device. In some situations, a serial bus may be coupled to a number of devices or modules which relies upon the individual module sensing the availability of the interconnection between the modules and capturing control of the communication link at the time data transmission is available. In such arrangements, there can be only one "talker" on the line but many "listeners", and require an implementation of collision avoidance arrangements to ensure that data transmitted from one module is unambiguously received by the desired destination module. The foregoing arrangements, while applicable to both printed circuit and integrated applications, each present a variety of advantages and disadvantages to the circuit designer depending upon the specific implementation.

Problems arise in integrated applications where the integrated device may include a number of modules with which communications is desired, such communications being channelled through a single external interface port associated with the integrated device. An arrangement such as this is shown in FIG. 1 where a single integrated device 10 is shown illustrated which includes a communication module 12 located at or near a periphery of the device 10 and to which an external communication link 14 connects. Within the device 10 are a plurality of modules 16A–16E with which data from the communication link 14 is desired to be transferred. To facilitate this, the communications module 12 includes a number of communications links 18A–18E to the respective modules 16A–16E which provide for the multiplexing of communication signals to the intended module 16A–16E. The links 18A–18E typically comprise a parallel bus arrangement. Where an arrangement similar to FIG. 1 is implemented in a printed circuit or larger scale application, such an arrangement presents little problem to the electronics designer in terms of the specifics of implementing the various communication links around the printed circuit card or system. However, as illustrated, when the arrangement of FIG. 1 is integrated into a single electronic chip device, problems arise where the number of individual modules 16 becomes large, thus necessitating a correspondingly large number of links 18. Where the modules 16 are spread about the integrated device, it becomes architecturally difficult for the integrated circuit designer to provide for the various integrated and wire connections between the modules 16 and the communication interface module 12. There is also insufficient room on the integrated circuit in the vicinity of the module 12 to allow for convenience and/or economic placement of the communication links.

One solution to this problem is illustrated in FIG. 2 where a communications arrangement 20 is provided incorporating a ring-bus which interconnects a plurality of modules 24A–24F, each having corresponding connections 26A–26F to the bus 22 Where required, any one of the modules 24A–24F can be configured for communications to an external arrangement and thus the arrangement 20 may be used in both printed circuit and integrated applications. Such an arrangement requires the implementation of tri-state logic to allow coupling to the ring bus 22. The arrangement of FIG. 2 becomes problematic, particularly in integrated applications, as the ring bus 22 is required to have connected to it a number of modules all representing varying loads and this may result in transmission problems within the device resulting in difficulties in resolving conflicts such as those mentioned above.

It is an object of the present invention to substantially overcome, or at least ameliorate, one or more of the aforementioned problems and/or provide an alternative bus architecture configuration.

SUMMARY OF THE INVENTION

In accordance with one aspect of the present invention there is disclosed an internal bus architecture for an integrated circuit device comprising a plurality of modules with which communication is desired via an access port of said device, said architecture comprising:

a plurality of bus segments, each said bus segment interconnecting two of said modules to form a closed loop of said modules connected by said segments; and a plurality of bus controllers, each said bus controller being associated with a corresponding one of said modules to at least contribute to a unidirectional transfer of communications transactions about said loop, from said access port to a destination one of said modules.

In accordance with another aspect of the present invention there is disclosed a method of communication between an external port of an integrated circuit device and one of a plurality of modules formed with said device, wherein said modules are interconnected by bus segments to form a closed loop, said method comprising the steps of:

(a) forming a communications transaction at said external port, said transaction including a destination address associated with one of said modules;

(b) passing said transaction sequentially via said bus segments between said modules wherein at each said module said destination address is checked for correspondence with an address associated with said module, whereby (c) if no correspondence is determined, said transaction is passed to a next one of said modules; or (d) if correspondence is determined, an operation associated with said transaction is performed at said destination address.

Other aspects of the present invention are also disclosed.

BRIEF DESCRIPTION OF THE DRAWINGS

A number of embodiments of the present invention will now be described with reference to the drawings in which.

DETAILED DESCRIPTION

Figure 1:
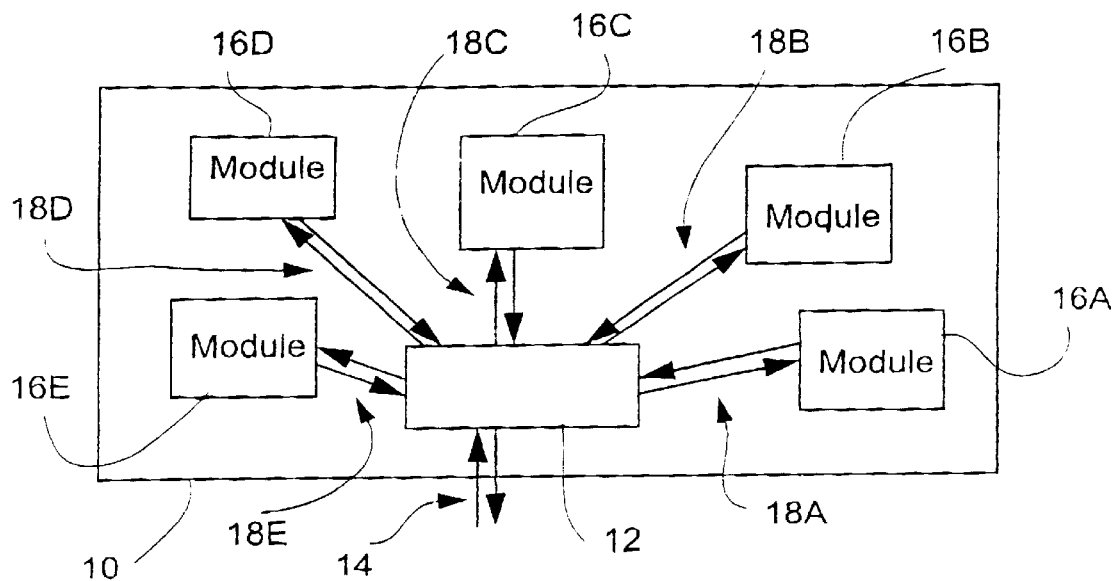
FIG. 1 depicts a prior art arrangement.
Figure 2:
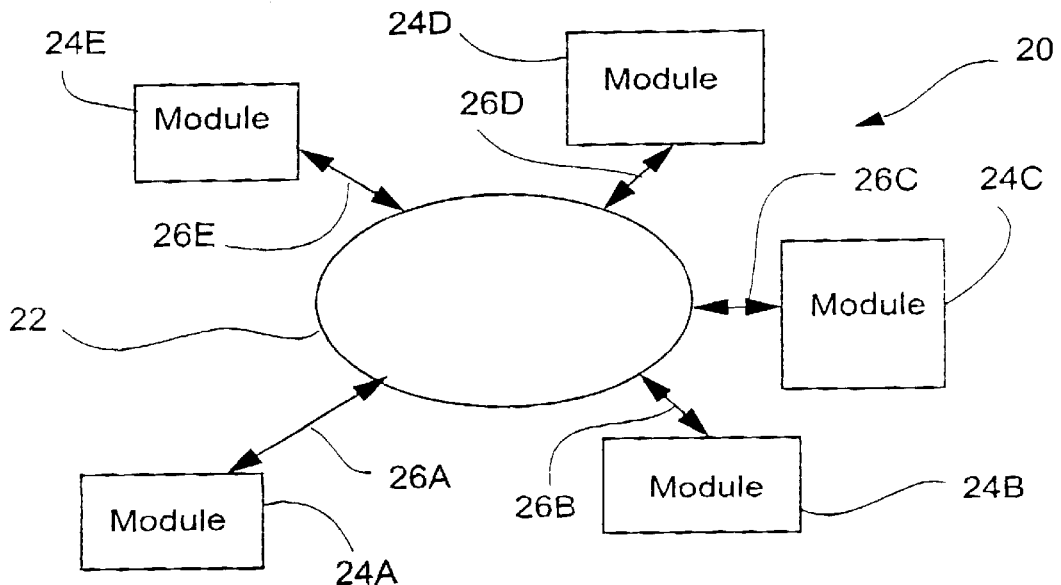
FIG. 2 depicts a flirter prior art arrangement.
Figure 3:
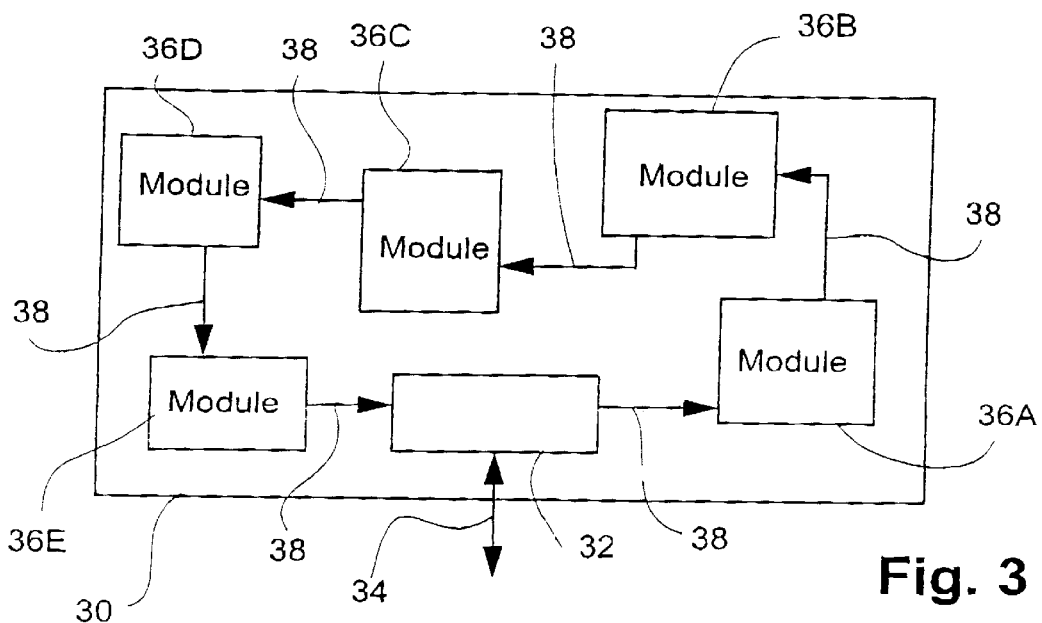
FIG. 3 is a schematic block diagram representation of a sequential bus arrangement in accordance with a first embodiment.

FIG. 3 illustrates the bus architecture system in accordance with an embodiment of the present invention formed within a integrated circuit device 30 having a communications port 34 configured to permit interface with electronics systems not illustrated. The port 34 connects to a communications module 32 forming part of a sequential bus arrangement incorporating a number of modules 36A–36E of the device 30 and a number of unidirectional interconnections 38A–38F arranged between sequential ones of those modules 36A–36E.

Not illustrated in FIG. 3, but as would be appreciated by any person skilled in the art, the device 30 may include a number of further connections external and internal to the device 30 that connect to the various modules 36A–36E.

In the arrangement of FIG. 3, communication signals received by the communication module 32 include both data and address components, the address component, being an address of or within an intended one of the modules 36A–36E to which the data is to be applied and/or used. In this fashion, the module 32 instigates the transfer of the communication transaction around the sequential bus, with each module 36 examining the intended address carried by the transaction to determine whether or not the data is intended for that particular module 36, and if not, being responsible for the transfer of the communication transaction to the next module until such time as the communication transaction is received by the destination module Further, any one of the modules 36A–36E can transmit a data package onto the bus in a similar fashion where it may be used by any of the other modules 36A–36F or communicated external to the device 30 via the bus connection 34.

The specific embodiments of the present invention described herein arose from a need to provide for the setting and examination of configuration and control registers distributed about individual modules of a large application specific integrated circuit (ASIC) developed as a computer graphics co-processor. In this regard, the purpose of the sequential bus of the preferred embodiment is to provide for the configuration of the ASIC prior to actual operation of the ASIC, and also for examination of the operation of the ASIC for debugging purposes. As a consequence, the speed at which the sequential bus of the preferred embodiment operates is not critical, thus permitting an implementation that allows the sacrifice of speed of communications in return for economy of chip space. As seen from FIG. 3, the sequential bus forms a daisy chain which interconnects each of the modules 36A–36F and forms a closed loop (or ring). The daisy chain is used to carry both request and response (ie. address, write data, read data, status and acknowledgment).

Figure 4:
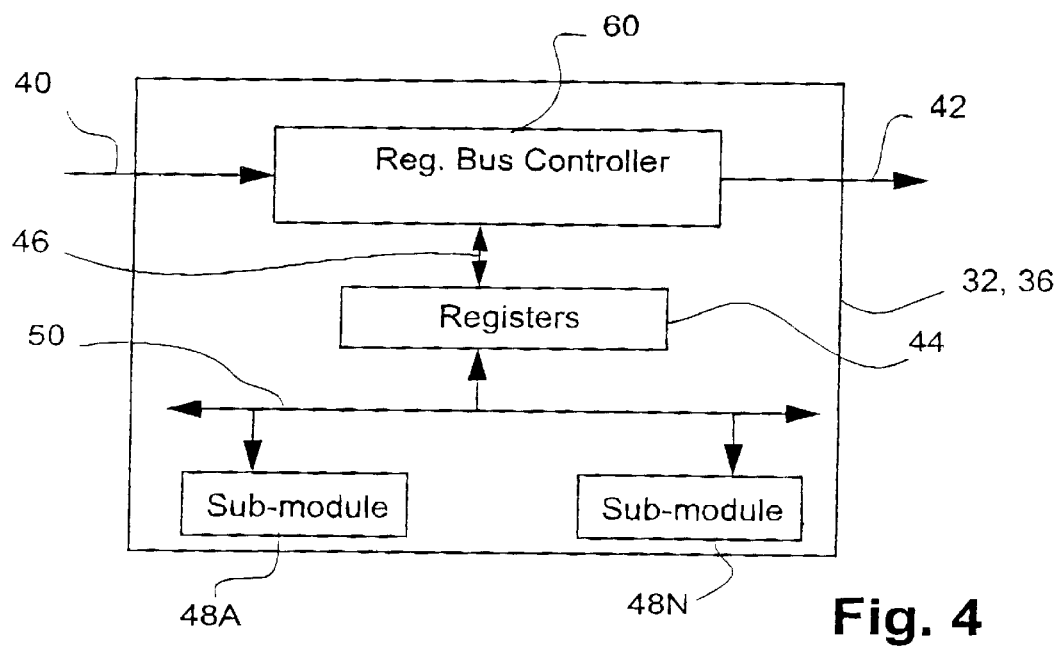
FIG. 4 is a schematic block diagram representation of the various connections within one of the modules 36 of FIG. 3.

In the preferred embodiment, communication about the sequential daisy chain bus is managed by a bus controller 60 formed within each module 36 and the communications module 32, and as seen in FIG. 4. The bus controller 60 provides for interconnection between an input bus component 40 and an output bus component 42 of the sequential daisy chain bus. The bus controller 60 in a preferred embodiment connects within the respective module 32,36 with plurality of register 44 via a bi-directional connection 46. The register 44 are coupled to a plurality of sub-modules 48A–48D within the module 32,36 via a traditional, localized bus confirmation 50 which, for example, may be a parallel bus or an I²C bus in accordance with IEEE 488 standards. Specifically, where the bus controller 60 is formed withing the communication module 32, the bus the bus 46 may be configured as the communication port 34.

The bus controller 60 is configured to receive communication packages via the bus connection 40 and to check for a transaction type of whether the transaction is either a request or a response. If the transaction is a response or a request that does not belong to the particular module 36, then the transaction is passed via the output bus 42 to the next module 36. Otherwise, the request transaction is processed via the matching module 36, which replaces the address with read data (in a read operation) and changes the control signals from request to response. In this regard, it is advantageous that each module 36:

(i) latch the transaction of the input, this introducing a single pipeline delay per module 36; and (ii) process the transaction within a single clock cycle.

By operating in this fashion, the latency produced in the sequential daisy chain bus is reduced to a single clock cycle per module 36. Through ensuring that the latency for each module 36 is identical, the overall latency of the sequential daisy chain bus can be configured to within a specific design limit so as to ensure that any request for data or communications thereof occurs within a known time period consistent with operating requirements of the system in which the device 30 is located.

Figure 5:
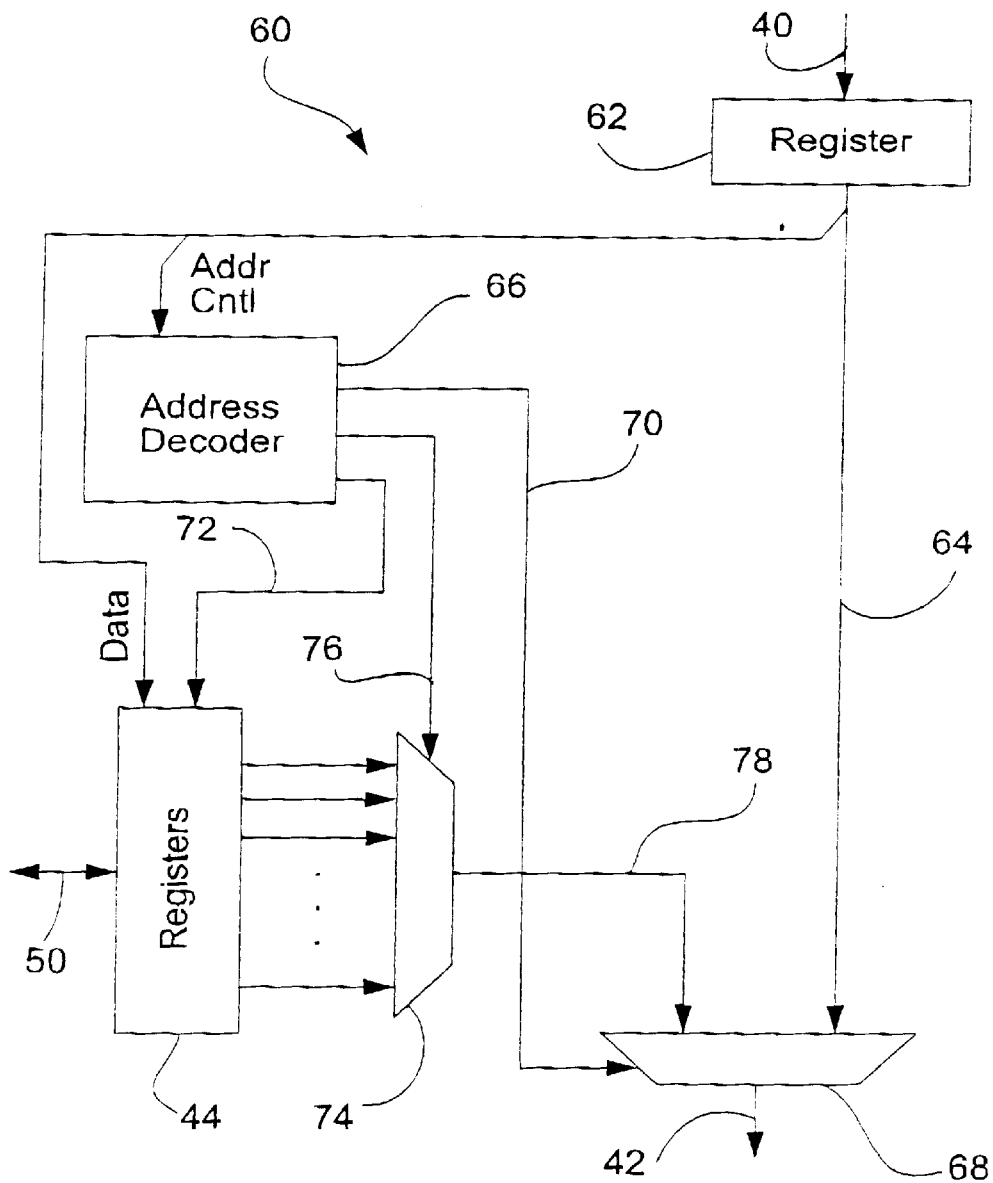
FIG. 5 is a schematic block diagram representation of a bus controller seen in FIG. 4.

In the preferred embodiment, the communication module 32 is the only one of the modules within the device 30 that is configured to initiate a bus cycle within the sequential daisy chain bus Turning now to FIG. 5, a schematic arrangement of the bus controller 60 is shown where it is seen that incoming address, data and control signals are received via the input line 40 to a register 62. Values on the input lines 40 are stored in the register 62 and made available on a bus 64 that distributes those signals within the bus controller 60.

The address and control signal components on the bus 64 are provided to an address decoder 66 which detects if the transaction being processed is one intended for the specific module 36 within which the bus controller 60 is located. If this is not the case, the address decoder 66 activates a multiplexer 68 via a control line 70 which couples the signals on the bus 64 to the output bus 42 for communication to the next module 36.

Where the address decoded by the decoder 66 corresponds to a transaction intended for the specific module 36 within which the bus controller 60 is located, the decoder 66 determines whether the transaction is one of a write to the particular module 36 or a read from the module 36, typically these actions operating upon the registers 44, also seen in FIG. 5. Where the decoded transaction is a read from the appropriate register, a multiplexer 74, which connects to the registers 44, is activated via a address selection line 76 to select the appropriate register output via a line 78 to the multiplexer 68. The signal on the line 70 to the multiplexer 68 selects the value on the line 78 for output via the output bus 42. Where the transaction involves a write to the registers 44, the address decoder 66 activates a series of control lines 72 which provide for coupling of data from the internal bus 64 to the registers 44 The value in the registers 44 may then be read by other components within the module 36 via the internal bus connection 50.

In the preferred embodiment, the bus connections 40 and 42 are provided by a 38-bit bus configuration having signal definitions as indicated in Table 1 below:

TABLE 1 reg_bus Signal Definitions

| Name | Type | Definition |
|---|---|---|
| reg_ad_in(35:0) | Input | incoming address/data signals to the module |
| reg_ad_out(35:0) | Output | outgoing address/data signals from module |
| reg_ack_in | Input | incoming acknowledge status |
| reg_ack_out | Output | outgoing acknowledge status |
| reg_valid_in | Input | incoming valid signal |
| reg_valid_out | Output | outgoing valid signal |

The combination of acknowledge and valid control signals determines whether or not the address/data signals are a request or response to the particular module 36. Table 2 below indicates the values of these bits in both request and response situations.

TABLE 2 ack_valid possible combination

| reg_ack_? | reg_valid_? | Comment |
|---|---|---|
| 0 | 0 | No data |
| 0 | 1 | request |
| 1 | 0 | response with no data valid or non-successful write |
| 1 | 1 | response with valid data or successful write |

Table 3 below indicates the particular breakdown of the register address bus components.

TABLE 3 reg_ad breakdown

| Type | reg_ad_? (35) | reg_ad_? (34:26) | reg_ad_? (25:8) | reg_ad_?(7:0) |
|---|---|---|---|---|
| request | write mode | not used | address | write data (in write transaction, otherwise not used) |
| response | | | reg_ad_?(35:0) read data | |

Figure 6:
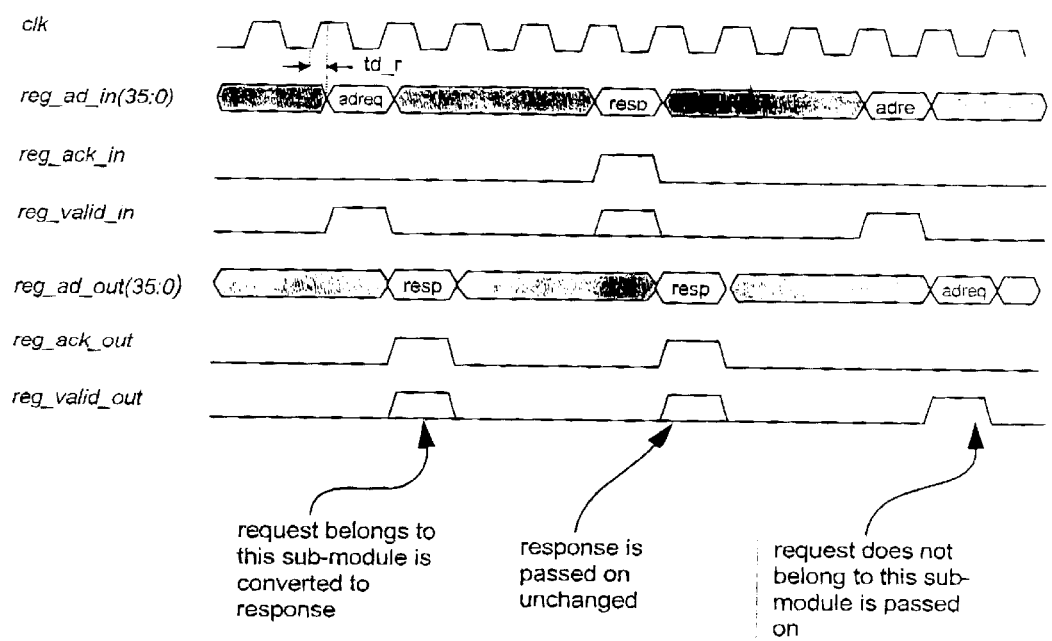
FIG. 6 is a timing diagram for signal sequences within the bus architecture of the preferred embodiment.

In the preferred embodiment, a request transaction is always initiated by the communications module 32 which contains sufficient parameters for the particular module 36 being addressed (such as address and write data during a write process). The transaction propagates to each module 36 at a rate of one module per clock cycle. FIG. 6 depicts various bus signal sequences available on the bus lines 40 and 42. As seen, when an address is detected that belongs to the particular module 36, the request reg_ack_out signal is enabled and whenever such a signal as enabled is received by another module 36, the transaction is passed unhindered.

As seen in FIG. 6, a first transaction involves a request at an address (adreq) seen on the reg_ad_in lines, accompanied by a valid reg_valid_in signal. This is interpreted as a read to one of the registers 44 and the bus controller 60 responds with a response (resp) on the reg_ad_out lines and valid reg_ack_out and reg_valid_out signals. That output is then considered by the next module 36, where it is passed unhindered, but with a one-cycle delay. In the preferred implementation, a rise time td_r of the bus is no more than two nanoseconds.

With the above described arrangement, there exist a number of alternatives for returning data from the daisy-chain bus. A first and simplest method is to limit the bus to a single request/response at any one time. Although expensive with respect to interrogation, such provides inherently for unambiguous identification of the response. A second method is to count clock cycles amongst a series of pipelined requests. Since each bus controller 60 operates with a defined 1-cycle delay, the required response can be determined from the delay between the request and the response. This provides for quick testing of any and all modules. A third alternative is for the module from which a request is made, to return an address or other identifier with the response data.

The above-described arrangements provide significant advantages when implementing bus architectures within large scale integrated circuits and the like. Significantly, in the preferred embodiment, a 38-bit bus provides a randomly accessible communication link between individual modules within the LSI graphics co-processor device while providing that there is no bottleneck of conductors at any one specific location around the periphery of the device to which external connections are made. This allows for an integrated circuit designer to distribute individual modules across the surface of the chip to ensure optimal location relative to each other while affording optimal communication with outside devices.

Variations on the above configurations may be made. In particular, the decoding operation depicted in FIG. 5 may be at least partly performed by the node communication module.

Figure 7:
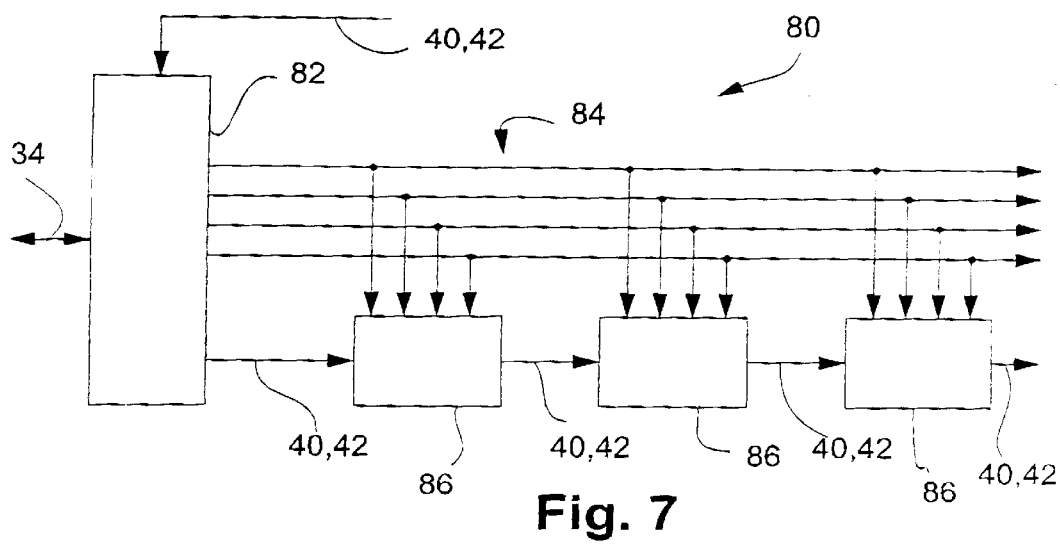
FIG. 7 depicts a further embodiment.

FIG. 7 shows such an arrangement 80 having a node module 82 forming the node of a daisy-chain loop formed by data lines 40,42 and modules 86, only some of which are seen. In this configuration, module addresses are partly decoded by the node module 82 and distributed via a single address bus 84 connecting to each module 86. Each module 86 contains a further decoder, corresponding in function to the decoder 66 of FIG. 5.

Figure 8:
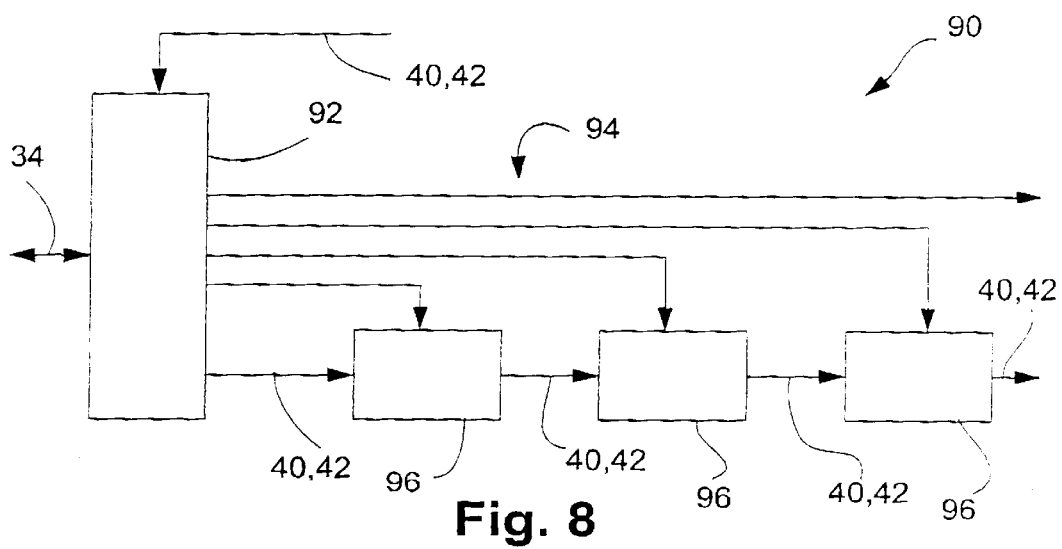
FIG. 8 depicts a still further embodiment.

In FIG. 8, an arrangement 90 has a node module 92 which acts to fully perform the address decoding operation where modules 96 in a daisy-chain loop of data lines 40,42 are provided with a unique address signal derived from a decoded bus 94. Such an arrangement finds optimal use where there is a small number of the modules 96 spread by long distances about the integrated circuit architecture.

Figure 9:
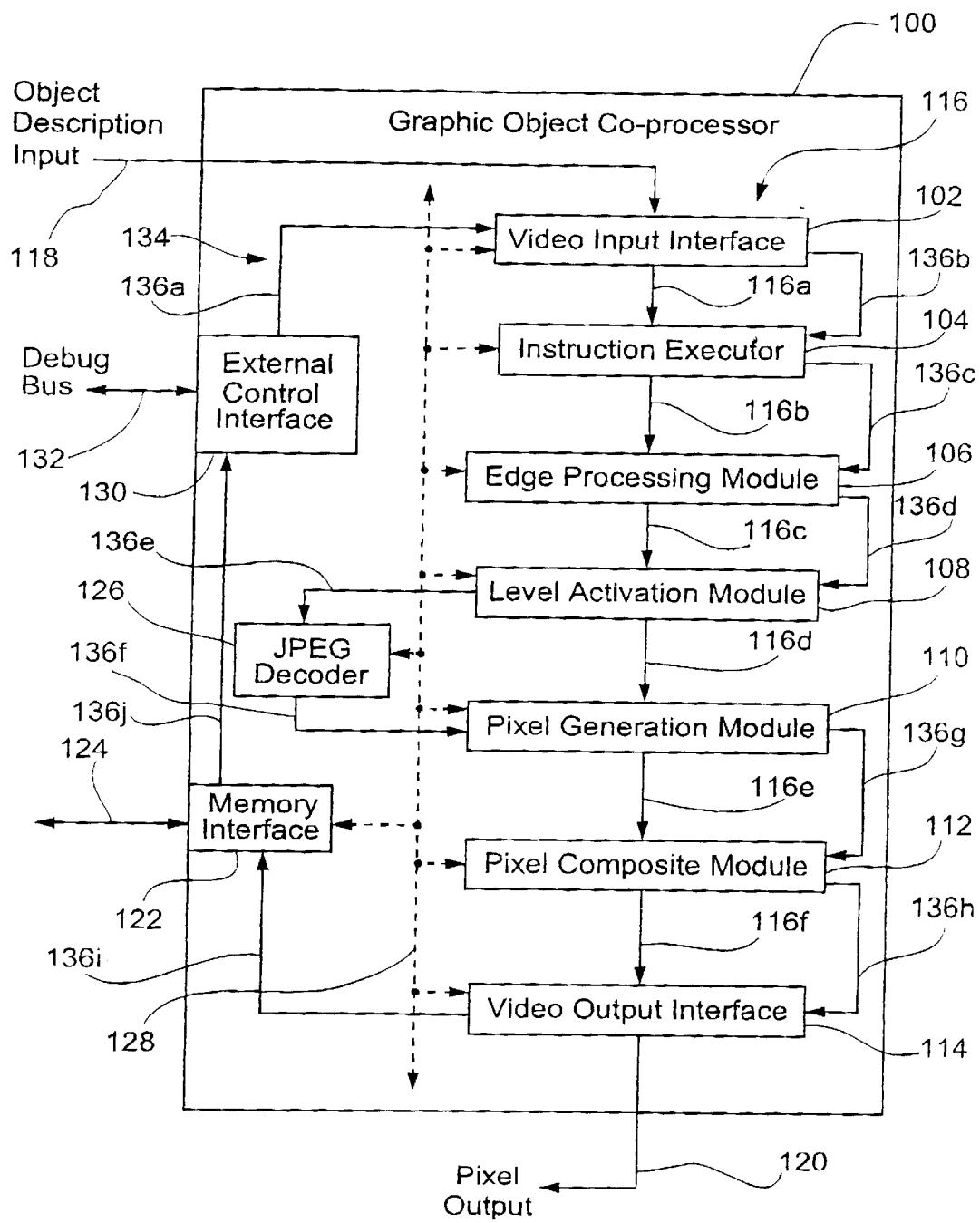
FIG. 9 is a schematic block diagram of a graphic object co-processor having a sequential bus arrangement.

FIG. 9 shows a graphic object co-processor 100 formed of a number of internal modules such as a video input interface 102, an instruction executor 104, an edge processing module 106, a level activation module 108, a pixel generation module 110, a pixel composite module 112, and a video output interface 114. Modules 102–114 form a pipeline 116 of processes by which the graphic object co-processor 100 processes an object description input 118 to form a pixel output 120. The pipeline 116 includes pipeline interconnections 116a–116f as illustrated interconnecting the various modules 102–114 in a pipeline fashion. Further modules such as a memory interface module 122 which couples to an external memory bus 124 and a JPEG decoder 126 are provided to facilitate the fetching or conversion of pixel-based object components and the like.

Although the pipeline segments 116a–116f convey rendering data and messages between the various modules 102–114, this being crucial to fast rendering of graphic object images, a further bus 128 is provided within the co-processor 100 to allow for the interconnection of the various modules 102–126 in a fashion common to most integrated systems architectures.

The video input interface 102 operates to couple the co-processor 100 to the object description input 118 to receive a page description language (PDL) representation of an image to be rendered, including graphical objects, and where appropriate, organize such data into a form or order that can be manipulated by the pipeline 116. The object description input in a preferred configuration is supplied over a PCI bus, known in the art. The video input interface 102 also sorts command, control and instruction, and object data that is not to be used early in the pipeline 116 from data to be immediately used providing for that other data to be temporarily stored in local memory coupled to the memory interface 122 via the bus 124.

The instruction executor 104 reads and processes instructions from the received PDL and formats the instructions into messages that are transferred for interpretation and use by the remaining modules in the pipeline 116. Some instructions may be passed over the bus 128 and some via the pipeline segments 116b–116f, depending on their respective functions and whether it is necessary for the instruction to accompany data being processed (rendered) along the pipeline 116.

The edge processing module 106 reads edge records derived from graphical objects described in the PDL, and determines a current scanline intersection for each edge in pixel position order across a rasterised display. This is preferably performed using a number of lists of active edges to enable sorting of the edge records into display order for each scanline. The edge processing module 106 outputs along the pipeline connection 116c to the level activation module 108. The level activation module 108 receives messages from the instruction executor 104 relating to priority level and fill data relating to graphical objects on the current scanline. Information contained in those message is preferably formed into a level activation table of graphical object properties. The edge crossing data received from the edge processing module 106 acts upon the table to determine those objects that are active for runs of pixels between adjacent edges and that contribute to the image being rendered. Such a process preferably takes account of objects having different opacity, as well as clipping objects.

The pixel generation module 110 receives the active runs and determines for each object the pixel color, or run of color to be used for each pixel location between the active edges. This may include an opaque color, a color blend or a pixel-based image windowed by the corresponding graphical object. Where the latter is the case, the actual pixel data may be fetched via the memory interface 122 over the bus 128. Where the image is in a compressed form, the compressed data extracted onto the bus 128 is decompressed by the JPEG decoder 126 before being supplied to the pixel generation module 110. The pixel data for each contributing object is then forwarded to the pixel composite module 112 where the pixel values for all active objects at the current pixel location, or run of pixel locations, on the current scanline, are composited together according to their priority ordering to give a rendered pixel value for each location or run of locations. The video output interface 114 receives the rendered pixels via the connection 116f and performs a buffering interface role to ensure that the pixel output 120 is formed into an appropriate raster data sequence of pixel values for each scanline of the displayed image so rendered.

In addition to being used for fetching pixel-based image components as described above, the memory interface 122 provides for the use of memory external to the graphics co-processor 100 in the various processing stages along the pipeline 116. For example, where a pipeline module may be involve in complicated and time-consuming processing, such as the compositing function, other preceding modules may be stalled. In such circumstances, data messages and the like may be temporarily stored in the external memory until such time as the stalled process becomes available. Further, in a preferred implementation, the pixel composite module 112 uses stack machines to perform evaluate expression tree-based compositing expressions. Depending on the size of such expressions (ie. the number of contributing active objects) or the complexity of the object (eg. a pixel image), external memory may be used to build and evaluate the stack.

Also provided within the co-processor 100 is an external control interface module 130 which couples to an external debug bus 132 which provides for the debugging of the operation of the co-processor 100. The debug bus 132, via the external control interface 130, couples to a debug loop bus 134 having segments 136a–136j which sequentially interconnect each of the various modules 102–126 with the external control interface in a manner corresponding to the functionality shown in FIGS. 3–5. The debug loop bus 134 thus provides for debugging of the operation of any of the modules 102–126 through access via the debug bus 132.

As seen in the arrangement of FIG. 9, the debug loop 134 and its segments 136a–136j are isolated from the processing pipeline 116, and its corresponding interconnecting segments 116a–116f, and also isolated from the main bus 128. As a consequence, the debugging of the operation of any one of the modules 102–126 may be performed without interrupting the render processing of the object description input 128 that provides the pixel output 120.

The debug loop bus 134 gives access to registers and memories within the video input interface 102. The bus 134 is used to test those memories by writing and reading back test patterns. During render processing operations, the bus 134 can be used to monitor activity in the video input interface 102. Such monitoring includes observing address pointers, job size counters, and data unpacking counters. PCI configuration registers containing PCI configuration settings associated with the input 118 are also observable on the bus 134 so that the state of the input 118 may be monitored. The bus 134 also forms a mechanism for enabling, checking and clearing interrupts from the video input interface 102, and generating software reset for the co-processor 100.

Status registers within the instruction executor 104 accessible via the debug loop bus 134 show an address of a current instruction being fetched from the local memory connected to the memory interface 122 and bus 122 and the current instruction being decoded. Using the bus 134 is also possible to send abort a rendering job by writing to a configuration register within the instruction executor 104.

Status registers within the edge processing module are accessible via the debug loop bus 134 to show the address of edges currently being fetched from the local memory via the memory interface 122.

Status registers in the level activation module 108 show the current x-coordinate and the current operation being processed by the level activation module 108. An output fill cache provided to buffer active object data from the level activation module 108 can also be turned off using a configuration register incorporated in the level activation module 108. All memories within the level activation module 108, such as the level activation table discussed above, are also available for interrogation via the debug loop bus 134 using read and write operations. If the level activation module 108 detects any priority levels out of order, or still active at the end of a line, they are also indicated in a status register accessible using the debug loop bus 134.

Status registers in the pixel generation module 110 include current cache control signals and a composite bus output and are available for examination using the debug loop bus 134. A fill table within the pixel generation module 110 is also available on the debug loop bus 134 for read and write operation.

Status registers accessible using the debug loop bus 134 within the pixel composite module 112 include a register identifying the particular compositing mode being used (either RGBO or CMYK), an attribute mode and a current composited colour and corresponding pipeline control signals. An un-premultiply division look-up table used for evaluating the compositing stack is also readable on the debug loop bus 134. In the case of overflow or underflow of the compositing stack, such is indicated in a dedicated status register.

Registers in the video output interface 114 allow for the configuration of an output data format and transfer protocol. The co-processor 100 may be configured so that output pins supplying the pixel output 120 may be set to show output data to the debug loop bus 134. Status registers in the video output interface 114 are used to indicate desirable information such as the current x-coordinate, length of the scanline and the location and size of a memory dump buffer (if it exists), which may be used where the rendered image is to be stored rather that immediately displayed. If an illegal instruction has been detected, such can also be indicated in a register within the video output interface 114 also accessible using the debug loop bus 134.

Status registers in the JPEG decoder 126 show if the decoder 126 is actively executing a decompression task, and if so, provide access to the parameters of the current task, such as the number of colour channels being processed, the type of operation, the type of transformation, the status of the list of tasks and the input data FIFO registers used in such a module. Also, low-level debug support information is provided to enable monitoring of data, such as current task address, current data fetch address, current data write address and data output, from various pipelined submodules arranged within the JPEG decoder 126. All memories formed within the JPEG decoder 126 are also available on the debug loop bus 134 for read and write operations.

The memory interface 122 contains status registers which are useful for debugging and also used for manufacturing testing. Registers useful for debugging include the particular read address being accessed, along with an associated burst_size for burst memory transfers, read_address_valid, and read_address_taken. The latter two registers are useful to show the pattern of read requests and the visibility of the request/grant signals which can be representative of stalling patterns. Similarly, a write request status is also available. Details regarding current and previous ones of the modules 102–126 granted access to the local memory via the memory interface 122 are also available in a common status register which give further information on the request patterns of modules relative to each other.

Several signals are also available as status registers which are required for manufacturing testing of proprietary components of the memory interface 122, such as a RAMbus core. The debug loop bus 134 allows those registers to be made visible as outputs for very little cost.

The external control interface 130 can work in both master and slave modes. Since this part of the co-processor 100 is complicated, a bus adjacent to a clock domain boundary crossing is visible in debug mode, which makes debugging a simple task. Further, since control signals which arrive at the co-processor 100 at the external control interface 130 are simultaneously visible, it is possible to observe protocol violations using the debug loop bus 134 which may expose a fault that could otherwise be impossible to find.

In a debug mode, the external control interface 130, which is the master of the debug loop bus 134, repeats all read transactions every single clock cycle thereby allowing continuous monitoring. Repeat behaviour continues until either debug mode is turned off or a different transaction comes along, in which case the latter transaction becomes the one that is repeated.

Although the present invention has been described with reference to embodiments configured for the update of status and control configurations, applications of the present invention may be extended to a variety of arrangements wherever access to data is required.

The foregoing describes only a number of embodiments of the present invention and modifications can be made thereto without departing from the scope of the present invention.

What is claimed is:

1. An internal bus architecture for an integrated circuit device, said integrated circuit device comprising a plurality of modules with each of which communication is desired via an access port of said device, said architecture comprising:
   a plurality of bus segments, each said bus segment interconnecting two of said modules to form a closed loop of said modules connected by said segments; and
   a plurality of bus controllers, each said bus controller being associated with a corresponding one of said modules to at least contribute to a unidirectional transfer of communications transactions about said loop, from said access port to a destination one of said modules, each said bus controller being configured to identify whether a communication transaction is intended for receipt by the corresponding module, and if not intended for the corresponding module, to pass said communication transaction to an adjacent module in the loop.

2. An architecture according to claim 1, wherein said access port comprises a decoder for interpreting an address of said destination module and for selecting said destination module via an address bus forming part of said architecture.

3. An architecture according to claim 2, wherein said address bus comprises a plurality of address lines, each said address line connecting to each one of said modules.

4. An architecture according to claim 2, wherein said address bus comprises a plurality of address lines, each said address line connecting to a corresponding one of said modules.

5. An architecture according to claim 1, wherein each said communication transaction comprises a destination address associated with one of said modules and each said bus controller comprises a decoder arrangement for determining if said destination address is associated with the corresponding module.

6. An architecture according to claim 5 further comprising transfer means for causing transfer of said communication transaction to the adjacent module in said loop when said decoder arrangement determines said destination address is not associated with said corresponding module.

7. An architecture according to claim 5, wherein each said bus controller comprises writing means for writing data associated with said communication transaction to said destination address within said corresponding module, said writing means being operable when said destination address is determined as being associated with said module.

8. An architecture according to claim 5, wherein each said bus controller further comprises reading means for reading data from said destination address within said corresponding module, incorporating said data into said communication transaction, and for causing transfer of said communication transaction to a next one of said modules in said loop, said reading means being operable when said destination address is determined as being associated with said corresponding module.

9. An architecture according to claim 8, wherein said destination address comprises a register within said corresponding module, said register being readable and writeable from within said module.

10. An architecture according to claim 1, wherein each said segment comprises at least one data line, at least one address line, and at least two control lines for controlling said unidirectional transfer.

11. A computer graphics co-processor integrated circuit device comprising an internal bus architecture according to claim 1.

12. An integrated circuit device incorporating a bus architecture according to any one of claims 1 to 10.

13. A method of communication between an external port of an integrated circuit device and one of a plurality of modules formed within said device, wherein said modules are interconnected by bus segments to form a closed loop, said method comprising the steps of:

(a) forming a communications transaction at said external port, said transaction including a destination address associated with one of said modules;

(b) passing said transaction sequentially via said bus segments between said modules, wherein at each said module said destination address is checked for correspondence with an address associated with said module, whereby (c) if no correspondence is determined, said transaction is passed to a next one of said modules; or (d) if correspondence is determined, an operation associated with said transaction is performed at said destination address.

14. A method according to claim 13, wherein said operation comprises writing data forming part of said transaction at said destination address.

15. A method according to claim 13, wherein said operation comprises reading data from said destination address to form part of said transaction, and passing said transaction between remaining ones of said modules to said external port.

16. A method according to claim 15, wherein a single said transaction is configured to be sequentially passed between said modules.

17. A method according to claim 15, wherein the sequential passing of said transaction occurs within a predetermined time period for each said module.

18. A method according to claim 17, wherein said external port monitors a passage time of said transaction to determine from which of said modules a particular transaction response emanates.

19. A method according to claim 18, wherein said predetermined period of time is one clock cycle and said external port counts said clock cycle.

20. A method according to claim 15, wherein a transaction including a request for information from one module comprises an identifying address being returned with a response to said request.

* * * * *

UNITED STATES PATENT AND TRADEMARK OFFICE
CERTIFICATE OF CORRECTION

PATENT NO. : 6,662,256 B1
DATED : December 9, 2003
INVENTOR(S) : Foo

It is certified that error appears in the above-identified patent and that said Letters Patent is hereby corrected as shown below:

Column 2,
Line 8, "bus 22" should read -- bus 22. --; and
Line 66, "flirter" should read -- further --.

Column 3,
Line 19, "a integrated" should read -- an integrated --.

Column 4,
Line 14, "withing" should read -- with in -- and "the" (third occurrence) should be deleted;
Line 15, "bus" should be deleted;
Line 37, "cations" should read -- cation --; and
Line 66, "a address" should read -- an address --.

Column 9,
Line 37, "that" should read -- than --.

Signed and Sealed this

Fourth Day of January, 2005

JON W. DUDAS
*Director of the United States Patent and Trademark Office*